INVENTOR
JOSEPH B. KUCERA
BY
ATTORNEY

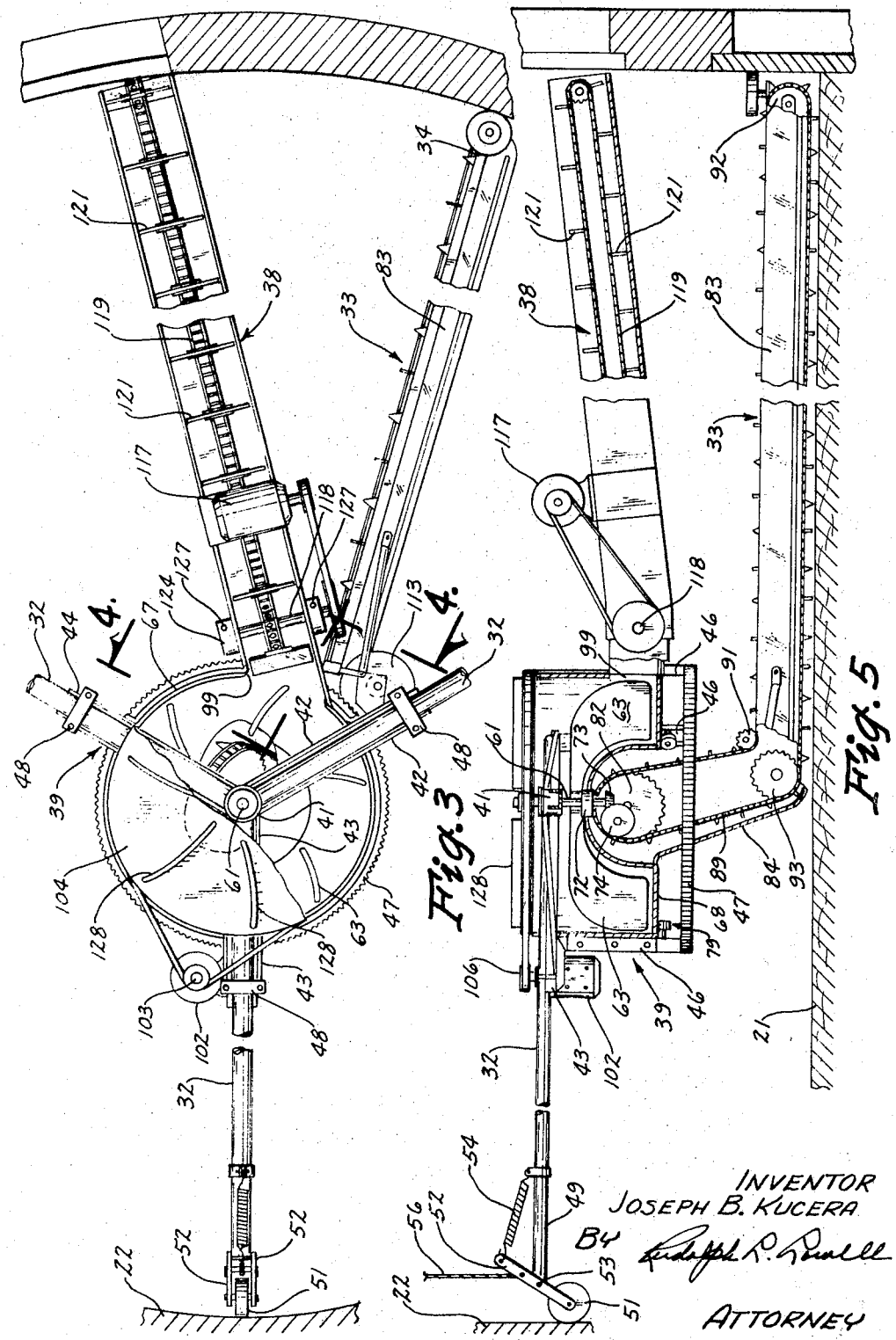

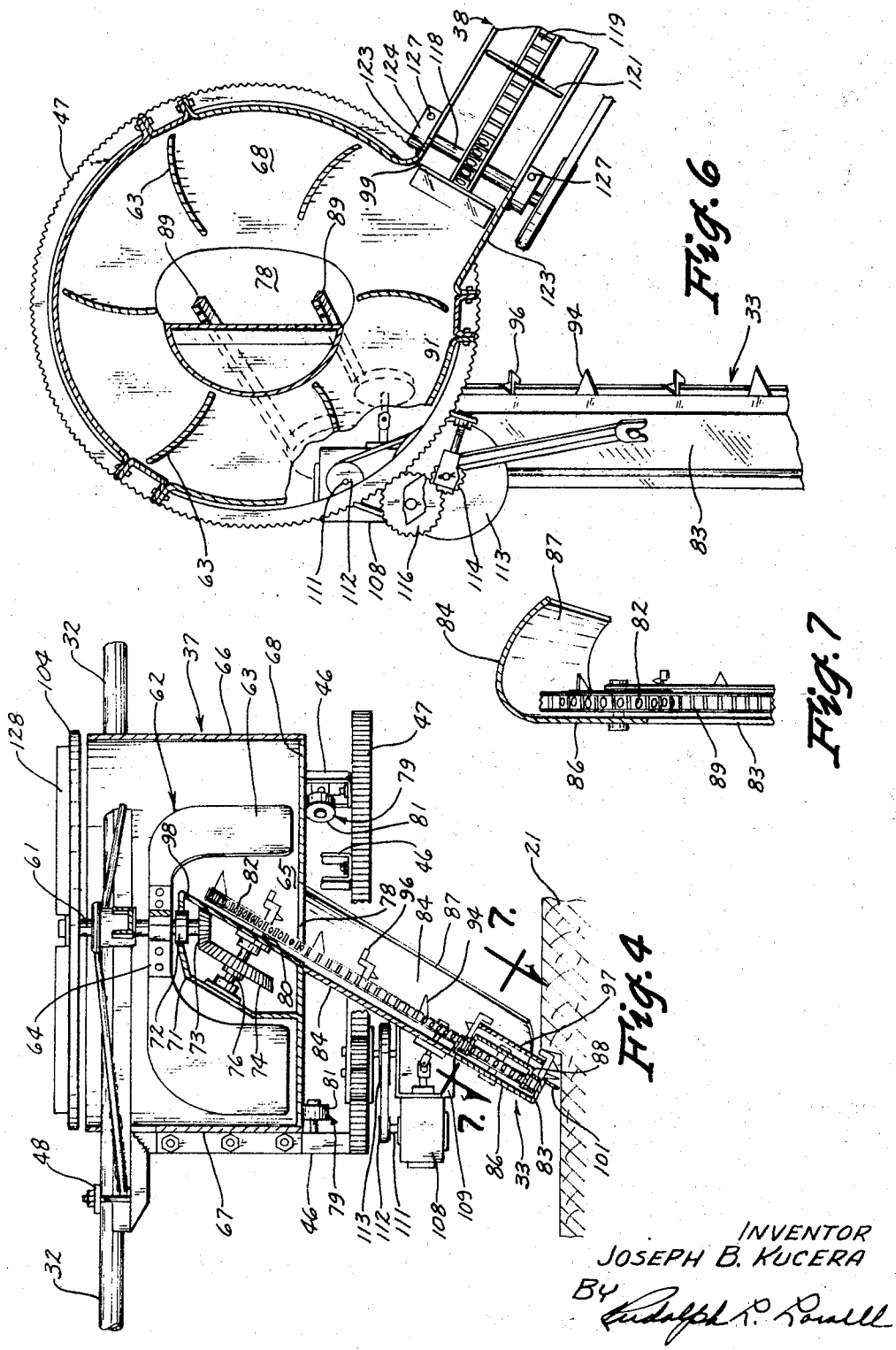

June 10, 1969   J. B. KUCERA   3,448,871
MATERIAL HANDLING APPARATUS

Filed April 5, 1967   Sheet 4 of 6

INVENTOR
JOSEPH B. KUCERA
BY
ATTORNEY

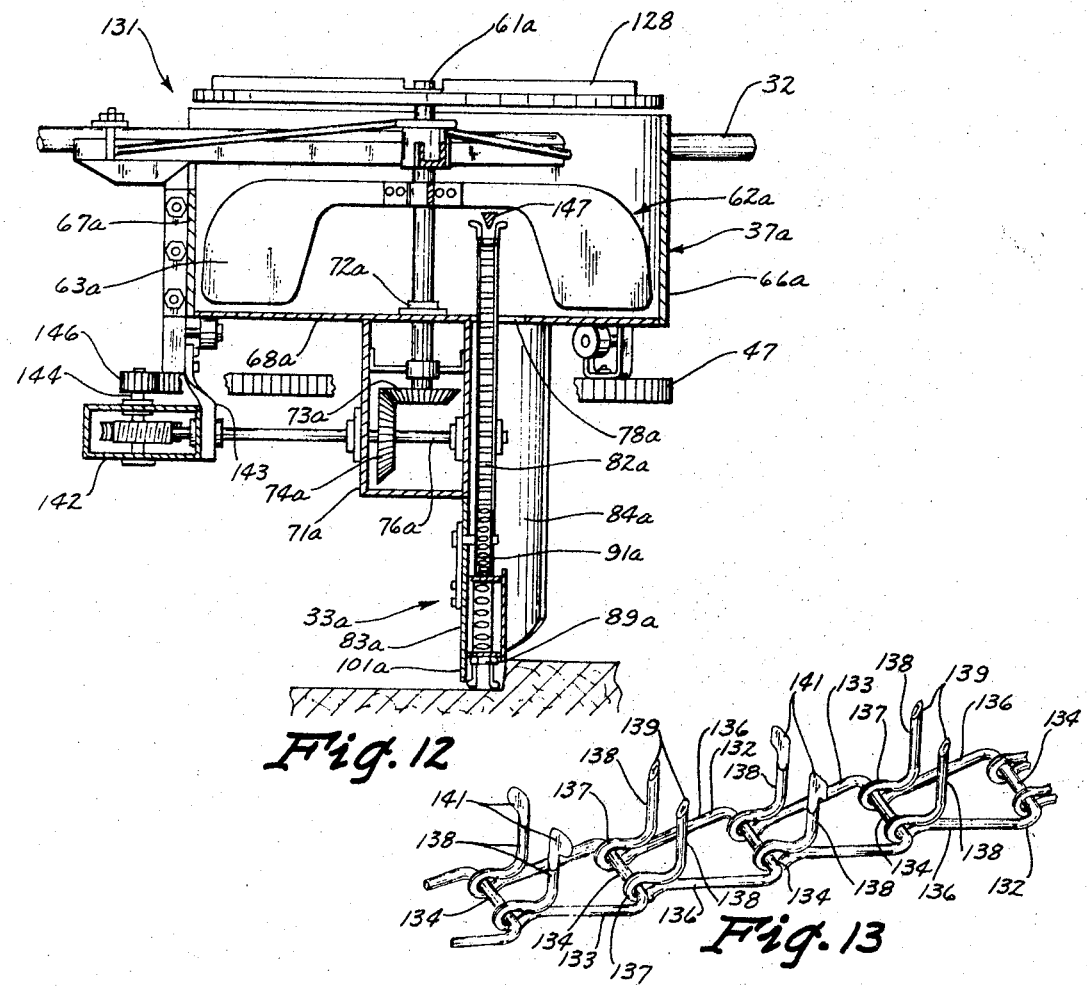
Fig. 12
Fig. 13
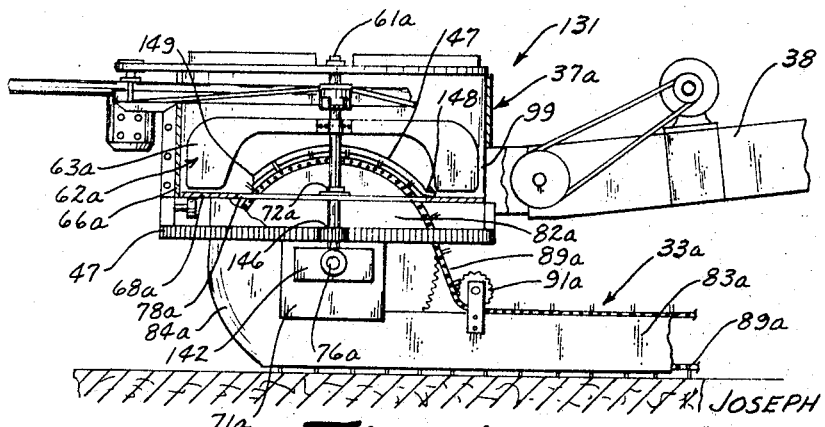
Fig. 14
INVENTOR
JOSEPH B. KUCERA
BY
ATTORNEY

United States Patent Office 3,448,871
Patented June 10, 1969

3,448,871
MATERIAL HANDLING APPARATUS
Joseph B. Kucera, Traer, Iowa, assignor of one-half to
Rudolph L. Lowell, Des Moines, Iowa
Filed Apr. 5, 1967, Ser. No. 632,502
Int. Cl. B65g 65/32, 65/34; A01f 25/16
U.S. Cl. 214—17                                 3 Claims

ABSTRACT OF THE DISCLOSURE

The silo unloader apparatus has a frame structure provided with attachable cable supported radially extended arms that are engageable with the silo side wall to support and maintain the frame structure centrally of the silo. A rotary conveyer or paddle unit on the frame structure receives silage from a silage gathering conveyer of endless chain type for delivery to a discharge conveyer that moves the silage out of the silo. A power unit on the frame structure drives the rotary conveyer, the silage gathering conveyer and a power transmission means for rotating the silage gathering conveyer horizontally about the frame structure. The discharge conveyer is releasably secured to the frame structure and carries its own power unit. The rotary conveyer includes a paddle assembly and a housing therefor, having a removable side wall. For silo loading the side wall and the discharge conveyer are removed so that the paddle assembly and the silage gathering conveyer cooperate to evenly distribute silage across the silo.

Background of the invention

Silo unloaders in general use are bulky and heavy to handle; require appreciable power for their operation; utilize pusher drive wheels to horizontally move the silage engaging and gathering conveyer means about the silo that dig into the silage to cause mold spoilage; are not generally adapted to accommodate silos that have become distorted from a circular shape to an oval shape; and usually require high speed operation to efficiently operate impellers or the like used in their construction. Additionally, these silo unloaders cannot be efficiently or readily used to distribute the silage evenly across the silo during silo loading operations.

Summary of the invention

The silo unloader of this invention is of a light compact construction and comprised of separable parts each of which can be readily handled by one man. The conveyer means for engaging and moving silage toward the center of the silo is postively rotated horizontally about the center of the silo by means requiring no engagement with the top surface of the silage. The silage engaging conveyer means is of an endless chain type and operates to move the centrally collected silage upwardly into the inlet of a rotary conveyer having a paddle assembly which rotates about a vertical axis to feed the silage into a discharge conveyer. The silage is thus gathered and discharged from the silo by a series of associated conveyer means and with the gathering and conveying of the silage taking place at any desired speed since at no time is centrifugal action required to move the silage.

During silo loading the discharge conveyer is removed as is also a side wall portion of the housing for the paddle assembly of the rotary conveyer. The paddle assembly thus acts in conjunction with the silage gathering conveyer to evenly distribute the silage across the silo. Additioinally the gathering conveyer, discharge conveyer and rotary conveyer require a minimum of power and operate efficiently to handle all types of silage while leaving the resultant silage surface smooth and free of any holes or torn areas.

Detailed description of the invention

Further objects and features of the invention will become apparent from the following description when taken in connection with the accompanying darwings, wherein:

FIG. 3 is an enlarged showing of the silage unloader apparatus of FIG. 2 with parts broken away to more clearly show its construction.

FIG. 4 is an enlarged sectional detail view as seen on the line 4—4 in FIG. 3;

FIG. 5 is an enlarged side elevational view of the unloader apparatus of FIG. 1 with portions broken away and other portions shown in section for the purpose of clarity;

FIG. 6 is an enlarged plan view of a part of the apparatus illustrated in FIG. 3 showing the power transmission system for horizontally rotating the silage gathering conveyer means;

FIG. 7 is a detailed sectional view taken along the line 7—7 in FIG. 4;

FIG. 12 shows a modified form of the apparatus illustrated similar to FIG. 4;

FIG. 13 is an enlarged sectional detail view of the chain which forms part of the gathering conveyer shown in FIG. 12; and FIG. 14 is a foreshortened side elevational view of the apparatus of FIG. 12 with some parts broken away and other parts shown in section for the purpose of clarity.

Figures 1, 2:
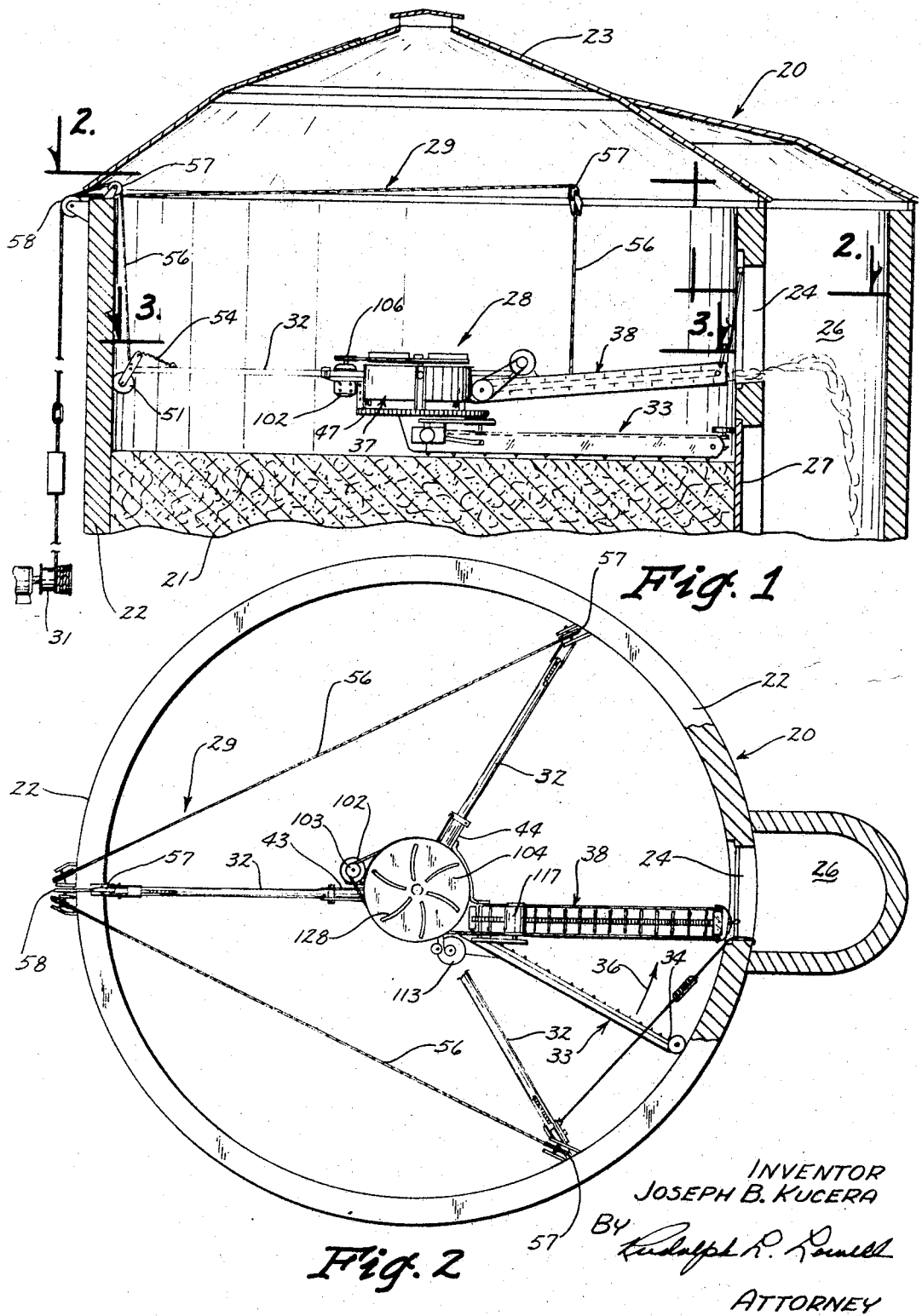
FIG. 1 is a foreshortened vertical sectional view of a silo showing in side elevation the silage unloader apparatus of the invention in operative relation with the silage stored in the silo.
FIG. 2 is a plan view of the silage unloader apparatus of FIG. 1.

Referring to the drawing, there is shown in FIG. 1, an upright cylindrical silo 20 partially filled with silage 21 such as cut grasses or corn. The silo 20 is a conventional structure and has a circular side wall 22 and a roof unit 23 supported on the top of the side wall 22. Vertically aligned openings or doorways 24 in the side wall 22 open into an upright silage discharge chute 26. In order to retain the silage 21 in the silo, removable doors 27 are positioned in the doorways 24. As the level of the silage is lowered the doors 27 are progressively removed from the doorways above the surface of the silage so as to provide an access opening from which the silage may be discharged into the chute 26.

The silo unloader apparatus of this invention is indicated generally at 28 and is suspended from the roof unit 23 by a three point cable support 29 operatively associated with a common winch means 31. In operation the silo unloader 28 collects and conveys the top layer of silage to the center area of the silo. From the center area of the silo, the silo unloader 28 conveys the silage through the doorway 24 into the discharge chute 26.

As illustrated in FIG. 2, the silo unloader 28 has three radially extended arm members 32 to which the cable support 29 is attached. A silage collector or gathering conveyer 33 of endless chain type extends radially of the silo 20 so that its outer end 34 is adjacent the inner peripheral surface of the silo wall 22. The gathering conveyer 33 is moved horizontally or walked about the silo in the direction of the arrow 36 shown in FIG. 2. During this walking movement the gathering or feed conveyer 33 engages and moves the top layer of the silage 21 toward the center area of the silo. The silage thus centrally collected is moved upwardly by the gathering unit 33 into a rotary conveyer 37 (FIG. 1) which delivers the collected silage into a discharge conveyer 38 for delivery into the chute 26 through a doorway 24.

The silo unloader 28 (FIGS. 3 and 5) includes a frame structure, indicated generally at 39, and comprised of a center hub member 41 having three angularly spaced radially extended arm supports 42, 43 and 44. Each arm support is of a channel shape in transverse cross section and carries inwardly from its outer end a depending leg member 46. The leg members 46 are also of a channel shape in transverse section and have their lower ends connected together by an externally toothed ring gear 47 which is in axial alignment with the hub member 41. The arm members 32 are of a tubular construction, correspond in number to the arm supports 42, 43 and 44 and constitute radial extensions for the arm supports. Each arm member 32 has an inner end section positioned within the channel of an associated arm support 42, 43 and 44 and secured thereto by a clamp assembly 48.

The outer or free end section 49 of each arm member 32 carries a wheel assembly 51 that includes a pair of arms 52 arranged in a straddling relation with an arm member 32 for pivotal connection therewith as indicated at 53. A spring 54 attached to the arms 52 acts to continuously bias the wheel assembly 51 into engagement with the silo wall 22. The three point cable support 29 includes three lift cables 56 each of which is connected at one end to a pivot 53 for travel upwardly and about a pulley 57 carried on the silo side wall 22. From a pulley 57, a cable 56 passes over a pulley assembly 58 for connection of its opposite end to the common control winch 31.

It is seen therefore that the silo unloader 28 is positively supported by the cables 56 in a level position against lateral tilting movement, and with this level position being maintained at all operated positions of the winch mechanism 31.

Rotatably supported within the hub member 41 of the unloader frame structure 39 and projected downwardly therefrom is an upright drive shaft 61 (FIGS. 3 and 4). A rotary conveyer 37 includes a paddle assembly 62 mounted on the shaft 61 for rotation therewith. This assembly is illustrated as comprised of six paddle members 63 arranged in diametrically opposite pairs. As clearly appears in FIG. 4 each paddle member 63 projects downwardly from the outer end of a radially extended support arm 64 so that the inner upright sides of the paddle members 63 define therebetween a space or chamber 65 of a substantially dome shape.

A housing 66 for the paddle assembly 62 includes an upright circular side wall 67, secured to the leg members 46. A rotatable bottom wall 68 for the housing 66 is integrally formed at its central portion with an upright gear housing 71 that is located within the chamber 65 formed by the paddle members 63. The gear housing 71 is rotatably mounted at 72 on the upright drive shaft 61, the lower end of which carries a bevel gear 73 located within the housing 71. The gear 73 is in continuous meshed engagement with a bevel gear 74 mounted on a shaft 76 that is rotatably supported in the housing 71 with one end section 80 thereof projected outwardly and downwardly from the housing 71 at a position overlying a material inlet opening 78 formed in the bottom wall 68 at the central portion thereof. Roller assemblies 79 mounted on each frame leg member 46 includes a roller 81 positioned inwardly of a corresponding leg member 46 for rolling engagement with the outer peripheral portion of the underside of the bottom wall 68.

It is seen, therefore, that the paddle members 63 are rotatable with the upright drive shaft 61 for rotation about the gear housing 71 and relative to the gear housing 71 and bottom wall 68 for successive movement over the material inlet 78.

The projected end section 80 of the shaft 76 carries a drive sprocket 82 (FIG. 5) which forms part of the silage gathering or collector conveyer 33. As shown in FIGS. 4 and 5 the silage gathering conveyer 33 includes a longitudinally extended upright beam member 83 of a channel shape in transverse cross section. Secured to the inner end of the beam member 83 is an upright arcuately curved chute 84 (FIG. 7) having one side portion 86 located substantially in the plane of the web of the channel beam 83. The opposite side section 87 of the chute 84 bent about the drive sprocket 82 so that the sprocket 82 is located between the side sections 86 and 87. The upper end of the chute 84 (FIG. 4) is secured as by welding to the underside of the rotatable bottom wall 68 in a partially surrounding relation with the material inlet opening 78.

Figure 8:
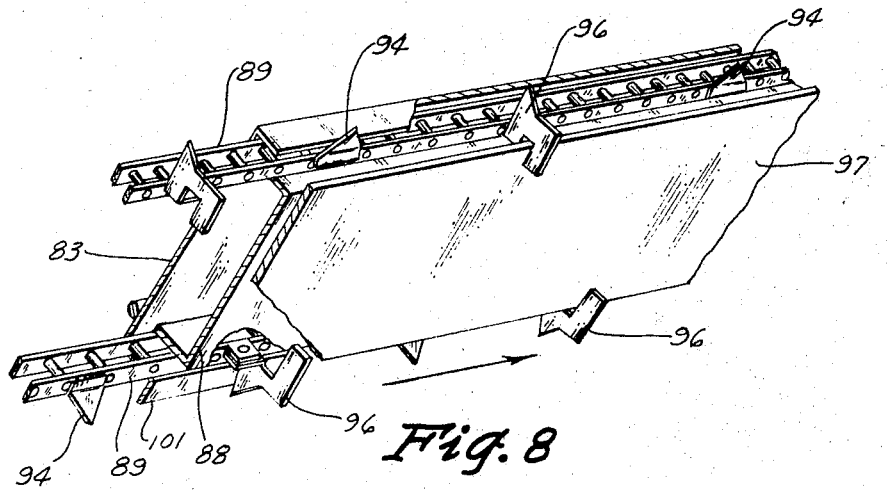
FIG. 8 is an enlarged fragmentary perspective view of a portion of the silage gathering conveyer.

Coextensive in length with the beam member 83 (FIG. 8) and positioned therein is a channel beam 88 having the open side thereof facing the open side of the beam member 83. The channel member 88 is arranged centrally of the channel beam 83 so that the adjacent flanges of the channel members 83 and 88 are spaced a distance apart to form guideways for the upper and lower runs of an endless chain 89. The chain 89 (FIG. 5) is trained about the drive sprocket 82 with its upper length or run passing under an idler sprocket 91 located at the upper inner end of the beam member 83. From the sprocket 91 the chain is trained about an end sprocket 92 carried at the outer end of the beam 83 with the chain then having a lower run extended from the sprocket 92 about an idler sprocket 93 located substantially opposite the sprocket 91 for upward travel about the drive sprocket 82.

Spaced longitudinally of the endless chain 89 are a series of tooth or material engaging members 94 and combination material engaging and collecting members 96 for moving the silage 21 toward the center of the silo 20. A holding plate 97 (FIG. 8) secured in a spaced relation outwardly from the channel member 88 is engageable with the members 94 and 96 to hold the chain 89 from falling downwardly out of a supported position on the flanges of the beam member 88. In this respect it is seen that the side 98 of the gear housing 71, the side section 86 of the chute 84 and the web section of the beam member 83 all lie in a common plane inclined downwardly at an angle of about thirty degrees relative to the longitudinal axis of the drive shaft 61, and with this inclination being in a rearward direction relative to the direction of travel of the gathering conveyer or collector unit 33 within the silo (FIG. 4).

As thus far described it is seen that on operation of the gathering conveyer 33 the lower run of the chain 89 is moved inwardly from the slio wall 22 with the tooth members 94 and 96 acting to progressively engage and move the silage centrally of the silo into the chute 84, and then upwardly of the chute and through the material inlet opening 78 into the housing 66 of the rotary conveyer 37.

The silage moved upwardly in the chute 84 tends to bubble upwardly through the opening 78 and into the path of movement of the paddle members 63, with the inclined support of the endless chain 89 providing for the silage being moved toward the paddle members by the teeth members 94 and 96. The material within the housing 66 is moved by the paddle members 63 into a material outlet opening 99 (FIGS. 3 and 5) formed in the housing side wall 67. The inner end of the discharge conveyer 38 is positioned at the opening 99 to directly receive the silage therefrom for delivery through the silo openings 24 into the discharge chute 26.

As shown in FIG. 4 the silage engaging members 94 and 96 project below the beam member 83 so as to be engageable with the silage to be removed. The beam member 83 is formed with a lower scraper member 101, which is located rearwardly of the engaging teeth members 94 and 96 relative to the direction of travel of the gathering conveyer 33. The scraper edge 101 thus follows the cutting action of the endless belt 89 to collect and maintain removed silage within the path of movement of the material engaging members 94 and 96 for delivery into the chute 84. By virtue of the three point support of the silo unloader 28 from the silo wall 22 the gathering conveyer 33 operates in a horizontally extended position during its rotational movement about the silo.

Figure 9:
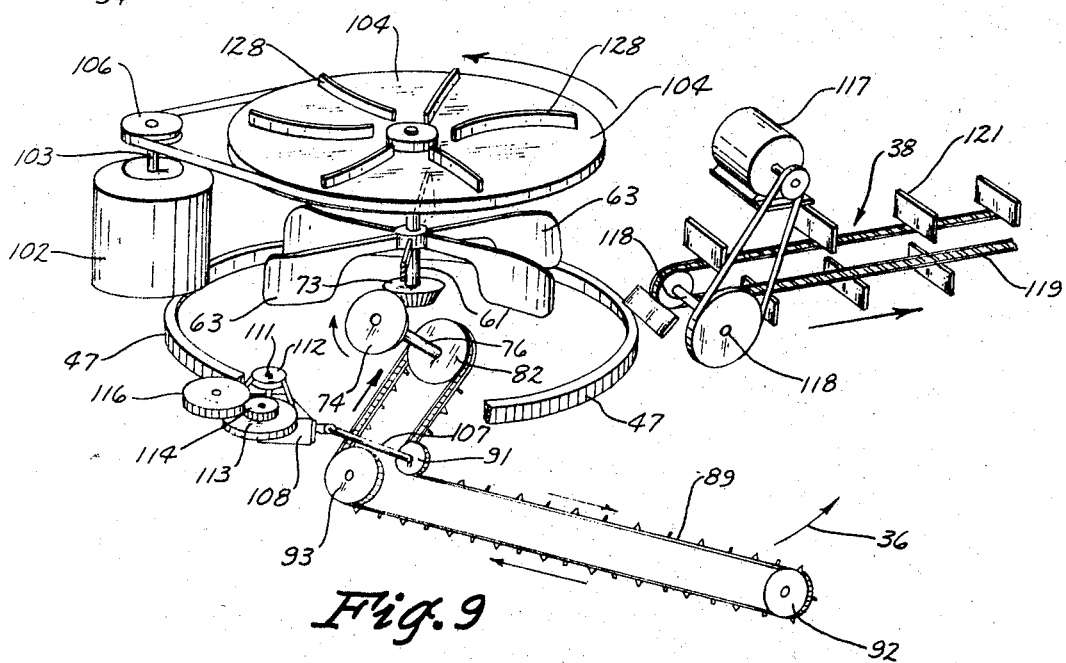
FIG. 9 is a diagrammatic showing of the power transmission system for operating the silage gathering conveyer, the rotary conveyer, the discharge conveyer, and for rotating the silage gathering conveyer horizontally about the silo.

Horizontal rotational movement of the gathering conveyer 33, operation of the endless chain 89 and rotation of the paddle assembly 62 is accomplished from a single electric motor 102 (FIG. 9) mounted on the arm support 43 with its drive shaft 103 in an upright position. A relatively large pulley 104 is mounted on the drive shaft 61 at a position above the hub member 41 to form a top wall for the housing 66 of the rotary conveyer 37. The pulley 104 is belt connected to a drive pulley 106 mounted on the motor shaft 103. The drive shaft 61 is thus directly rotated from the motor 102 through the pulleys 104 and 106. As previously explained the drive sprocket 82 for the endless belt 89 is driven from the drive shaft 61 through the gear 73 and 74.

To horizontally rotate the gathering conveyer 33, the shaft 107 for the sprocket 91 is connected in a driving relation with a gear reduction unit 108 that is carried on a mounting plate 109 (FIGS. 4 and 9) attached to the side section 86 of the chute 84. The output shaft 111 of the reduction unit 108 carries a pulley 112 which is belt connected with a pulley 113 rotatably supported on the mounting plate 109. Coaxial with the pulley 113 is a drive gear 114 for an idler gear 116 that is in meshed engagement with the externally toothed ring gear 47. Thus on rotation of the gear 116, and with the ring gear 47 remaining stationary, the gear 116 is walked about the gear 47 to in turn provide for the walking or horizontal rotational movement of the gathering conveyer 33 about the silo 20.

The horizontal rotation of the gathering conveyer 33 relative to the drive shaft 61 is thus positive and may be readily varied as to rate of rotation. Importantly, to accomplish this rotational movement, traction devices engageable with the top surface of the silage 21 are entirely eliminated, so that the top surface of the silage is always maintained smooth and level. Spoilage of the silage is thus reduced to a minimum. The action of the chain 89 not only leaves a raked top surface for the silage, but the travel of the teeth members 94 and 96 about the idler end pulley 92 at positions adjacent the silo wall 22 function as chippers to remove any silage from the inner peripheral surface of the silo side wall 22.

The discharge conveyer 38 (FIG. 9) carries its own electric motor 117 which is belt connected directly to a drive shaft 118 for operating an endless chain 119 provided with axially spaced hand or paddle members 121.

Figure 10:
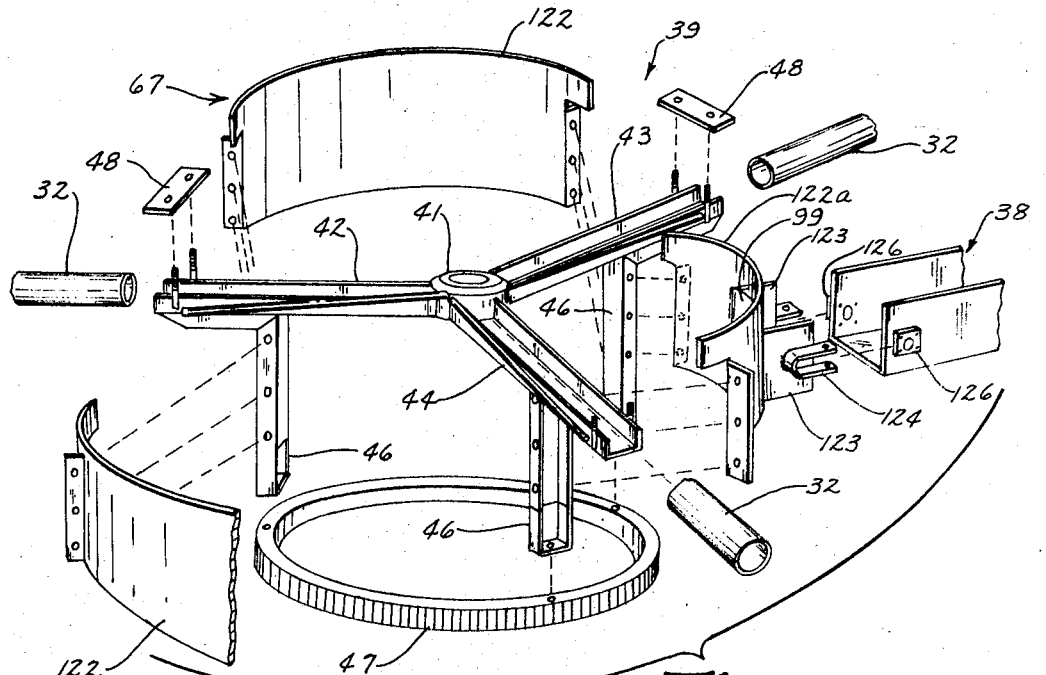
FIG. 10 is an exploded perspective view of the main frame structure of the silo unloader apparatus of this invention.

Referring to FIG. 10 it is seen that the housing side wall 67 of the rotary conveyer 37 is formed of a plurality of arcuate sections 122, illustrated as three in number, which are connectable together at the leg members 46 to form the continuous circular side wall 67. The side wall section, indicated as 122a and which section is formed with the material outlet opening 99, has a pair of peripherally spaced outwardly projected mounting plates 123 positioned at opposite sides of the opening 99. Each plate 123 carries a U-shape bracket or clevis 124 faced in an outward direction. Bearings 126 for the drive shaft 118 of the discharge conveyer 38 are received within corresponding ones of the brackets 124 and are held against movement therefrom by pins 127 (FIG. 6) extended through aligned holes in the legs of the bracket or clevis 124. The discharge conveyer 38, as a complete self-operated unit, is thus readily removed from or assembled with the unloader apparatus 28.

In the use of the unloader apparatus 28 for loading the silo 20, the discharge conveyer 38 is removed from the wall section 122a, after which the wall sections 122 and 122a are removed from the frame structure 39. Also, as shown in FIGS. 3 and 4, the top surface of the pulley 104 is provided with a series of radially extended upright vanes 128.

Figure 11:
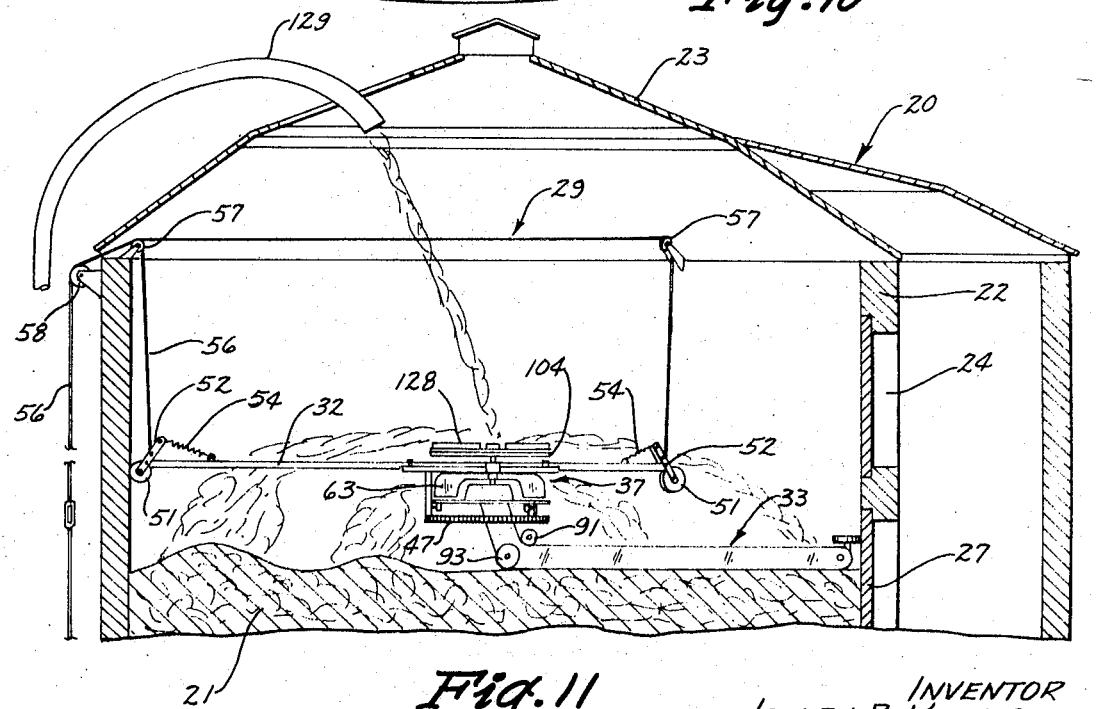
FIG. 11 is illustrated similarly to FIG. 1 and shows the apparatus with certain parts removed to provide for its use for silo loading purposes.

Thus referring to FIG. 11 silage from a blower tube 129 falling onto the pulley 104 is thrown outwardly by vanes 128 toward the silo wall 22. As the gathering conveyor 33 rotates about the silo 20 the material thus accumulated adjacent the silo wall is moved inwardly of the silo. Any material gathered by the conveyor 33 is moved into the rotary conveyor 37 which, by virtue of the absence of the side wall 67, throws the silage delivered thereto outwardly into the silo.

It is seen therefore that the pulley vanes 128 and paddle members 63 function to throw silage at varying distances outwardly from the center of the silo, with the gathering conveyor 33 acting as a levelling device to fill up holes in the silage top surface and to remove excess silage from the surface.

The modified form of the silo unloader 131 shown in FIGS. 12–14, is generally similar to the unloader 28 described in connection with FIGS. 1–11. Like numerals, therefore, with the suffix a will be used to designate corresponding parts.

Referring to FIG. 12, the paddle assembly 62a for the rotary conveyor 37a has the paddle members 63a of a shape to move in a clearance relation with that part of a drive sprocket 82a which is projected upwardly into the housing 66a through the material inlet opening 78a of the rotatable bottom wall 68a. The gear housing 71a is disposed below and secured to the underside of the bottom wall 68a, which is rotatably mounted at 72a on the upright drive shaft 61a. A bevel gear 73a mounted on the lower end of the drive shaft 61a and located within the gear housing 71a is in meshed engegement with the bevel gear 74a mounted on the shaft 76a, which is horizontally extended through and rotatably supported on the gear housing 71a.

The drive sprocket 82a is carried on the inner end of the shaft 76a and is of a size such that its lower side is positioned at substantially the bottom side of the gathering conveyor 33a. The endless chain 89a (FIG. 12) rides directly on the flanges of the channel beam 83a which is provided with a scraper blade 101a. The chain 89a (FIG. 14) is trained over the drive sprocket 82a, and then downwardly below the idler pulley 91a for travel of its upper length along the top side of the beam 83a to an idler pulley (not shown) at the outer end of the gathering conveyor 33a. From such idler pulley the lower length of the chain 89a travels along the bottom side of the beam 83a back to the drive sprocket 82a.

The chain 89a is comprised of links 132 and 133 (FIG. 13) formed of a rod material and alternately interconnected over the full length of the chain. A link 132 is of a generally U-shape having a base 134 and legs 136 formed with loops or reversely bent portions 137 which terminate in upstanding projections 138 having bevelled cutting or digging edges 139. A link 133 is formed similarly to a link 132 except for the upstanding projections 138 terminating in flat gathering fingers 141.

In assembly the base 134 of one of the links 132 or 133 is rotatably received within the loops 137 of the other link, with all of the projections 138 extended in the same direction. In operation the links 132 function primarily to remove the top surface of the silage, with the links 133 acting to collect and move the removed material centrally of the silo and upwardly of the chute 84a into the rotary conveyor 37a.

The outer end section of the shaft 76a functions as the input shaft for a gear reduction unit 142 (FIG. 12), that is supported directly from the ring gear 47 by a mounting bracket 143. An output shaft 144 of the reduction unit 142 is vertically extended and carries a gear 146 that is walked about the ring gear 47 to horizontally rotate the conveyor 33a.

As shown in FIG. 14 the operation of the silo unloader 131 is in all respects similar to the operation of the unloader 28. The gathering conveyor 33a engages and moves silage centrally of the silo 20 and upwardly of the chute 84a into the material inlet opening 78a of the rotary conveyor 37a. The paddle assembly 62a then picks up the material at the inlet 78a for movement to the outlet 99 where it is taken by the discharge conveyor 38 for delivery to the silo chute 26.

An arcuate material stripper bar 147 (FIGS. 12 and 14) within the housing 66a is secured at one end 148 to the rotatable bottom wall 68a, and from such end is extended in a concentrically spaced relation about the upper portion of drive sprocket 82a and between the projections 138 of the chain links 132 and 133. The unsecured end 149 of the stripper bar 147 is tapered upwardly from its lower side to remove any material from between the projections 138. The stripped material is directed into the path of movement of the paddle members 63a.

In loading the silo 20, the housing side wall 67a and the discharge conveyor 38 are removed from the unloader 131, so that silage thrown outwardly by the vanes 128 and the paddle members 63a is levelled off by the action of the gathering conveyor 33a.

I claim:
1. A bulk material handling apparatus for use in a silo having an upright side wall with a discharge opening section comprising:
   (a) a housing having an upright circular side wall with a material outlet opening therein,
   (b) means supporting said housing centrally within said silo,
   (c) an upright drive shaft positioned centrally within said housing and rotatably mounted on said supporting means,
   (d) a circular bottom wall for said housing rotatably supported on said drive shaft and having a central portion formed with a material receiving opening,
   (e) a power unit on said supporting means operably connected to said drive shaft,
   (f) a paddle assembly within said housing fixed on said drive shaft including paddle members having upright material engaging portions movable adjacent said bottom wall between said material opening and the side wall of the housing to move material to said outlet opening, with the inner side surfaces of said material engaging portions defining a chamber means,
   (g) an endless material engaging and conveying means for gathering bulk material in the silo and conveying the material to said receiving opening including a discharge portion at said opening connected to said drive shaft, said discharge portion projected upwardly through said opening into said chamber means, and
   (h) conveying means having one end portion positioned at said outlet opening and an opposite end portion positioned at the discharge opening section in the silo side wall to move the bulk material from said outlet opening to said discharge opening section.
2. A bulk material handling apparatus for removing bulk material stored in the silo and for distributing bulk material during loading of the silo wherein the silo has a side wall with a discharge opening section, said apparatus comprising:
   (a) a frame structure,
   (b) means supporting said frame structure centrally within said silo,
   (c) an upright drive shaft rotatably supported on said frame structure,
   (d) a housing including an upright circular side wall releasably secured to said frame structure, and a bottom wall rotatably supported from said drive shaft, said housing side wall having a material outlet opening and said bottom wall a material inlet opening,
   (e) a paddle assembly on said drive shaft for moving material from said inlet opening through said outlet opening,
   (f) a first conveyor means operably connected to said drive shaft for collecting bulk material in the silo for delivery to said inlet opening,
   (g) a second conveyor means releasably secured to said frame structure for receiving material from said outlet opening for delivery to said discharge opening section,
   (h) a power unit for driving said second conveyor means mounted on said second conveyor means,
   (i) a second power unit mounted on said frame structure,
   (j) means for rotating said drive shaft from said second power unit including a driven member mounted on said upright drive shaft at a position above said housing side wall, and
   (k) vane members on the upper surface of said driven member for throwing material dropped thereon, during loading of the silo, outwardly toward the silo side wall,
   (l) said housing side wall and said second conveyer means being removed from the apparatus during the loading of the silo.
3. The bulk material handling apparatus according to claim 1 including:
   (a) a gear housing within said chamber means mounted on said bottom wall to one side of said material receiving opening,
   (b) said drive shaft having the lower end thereof rotatably extended within said gear housing,
   (c) a driven shaft rotatably supported in said gear housing having one end projected outwardly therefrom for driving connection with the discharge portion of said endless conveyer, and
   (d) coacting gear means on said two shafts and within said gear housing for connecting said drive shaft with said driven shaft.

References Cited
UNITED STATES PATENTS

| | | | |
|---|---|---|---|
| 2,677,474 | 5/1954 | Long et al. | 214—17 |
| 3,063,581 | 11/1962 | Bruecker | 214—17 |
| 3,229,828 | 1/1966 | Kucera | 214—17 |
| 3,291,325 | 12/1966 | Henningsen et al. | 214—17 |

ROBERT G. SHERIDAN, *Primary Examiner.*